March 18, 1969  G. J. FRYE  3,434,049
TIME DOMAIN REFLECTOMETRY SYSTEM HAVING A CURRENT SOURCE FOR
LOCATING DISCONTINUITIES IN A TRANSMISSION LINE
Filed Dec. 6, 1965

GEORGE J. FRYE
INVENTOR

BY
BUCKHORN, BLORE, KLARQUIST & SPARKMAN
ATTORNEYS

United States Patent Office 3,434,049
Patented Mar. 18, 1969

3,434,049
TIME DOMAIN REFLECTOMETRY SYSTEM HAVING A CURRENT SOURCE FOR LOCATING DISCONTINUITIES IN A TRANSMISSION LINE
George J. Frye, Portland, Oreg., assignor to Tektronix, Inc., Beaverton, Oreg., a corporation of Oregon
Filed Dec. 6, 1965, Ser. No. 511,614
U.S. Cl. 324—52       10 Claims
Int. Cl. G01r 31/11

ABSTRACT OF THE DISCLOSURE

A current source is employed to apply a step wave to a transmission line for detecting line discontinuities by reflection. The current source itself presents no significant discontinuity because of its high impedance, and it may therefore be used with a wide variety of lines. A detecting means such as an oscilloscope is also coupled to the transmission line under test for displaying reflections. The current source in a particular embodiment of the present invention includes a transistor output amplifier connected in a common base configuration and operated in a nonsaturated region of the transistor characteristic. A tunnel diode oscillator is effective for rapidly turning off such transistor to provide an output step wave.

---

Figure 1:
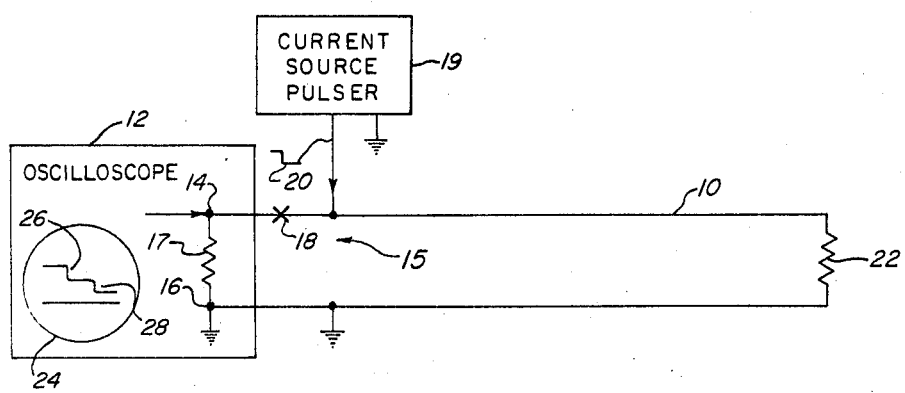

This invention relates to a time domain reflectometry system, and more particularly to a time domain reflectometry system adapted to the measurement of discontinuities in transmission lines of widely differing impedance characteristics utilizing display apparatus of noncritical input impedance.

Electromagnetic transmission lines are preferred which include no major faults or discontinuities and therefore exhibit substantially no changes in characteristic impedance therealong. Discontinuities produce reflections in the line resulting in low fidelity transmssion of an applied signal. Such reflections are generated as the electromagnetic signal in the line encounters an impedance change in the line. Although transmission lines sometimes necessarily include bends, twists, joints, connectors and the like, the resulting impedance discontinuities caused by mechanical design, as well as line damage, should be kept to a minimum. Therefore transmission lines are desirably tested electrically in order to determine the nature, location, and amplitude of impedance discontinuities therealong and ascertain whether these discontinuities are within desired limits.

Several methods are available for determining the location of impedance discontinuities. For example, slotted lines, frequency domain reflectometry systems and time domain reflectometry systems have been employed. The first two methods are rather cumbersome and not particularly adapted to simple measurement of a discontinuity location in a line without considerable interpretation. Time domain reflectometry, on the other hand, is simpler and more direct. In this system a given pulse is transmitted down a transmission line and the reflection from an impedance discontinuity is detected together with the time it takes for the pulse to reach the discontinuity and return. The location of the discontinuity is determined in a straight forward manner from the transit time involved.

Time domain reflectometry as heretofore practiced has required a source of pulses having an internal impedance matched to the characteristic impedance of the transmission line under test. A voltage pulse was thus transmitted down the line and the reflection thereof was measured or displayed, the display apparatus usually comprising an oscilloscope. However, the oscilloscope or other display device, as thus employed, has to have a very high input impedance for prevention of loading or interference with either the initial voltage pulse applied to the line or the reflection acquired therefrom. Moreover, the prior system was not readily capable of testing a wide range of different impedance transmission lines, dissimilar to the voltage source in impedance.

Therefore it is an object of the present invention to provide an improved time domain reflectometry system for use with a standard oscilloscope or other display device having either a high or low input impedance.

It is another object of the present invention to provide an improved time domain reflectometry system adaptable for testing a wide range of different impedance transmission lines.

It is another object of the present invention to provide an improved time domain reflectometry system wherein the reflection produced in a transmission line under test is not materially attenuated in the testing apparatus.

It is a further object of the present invention to provide a current source pulser for use in time domain reflectometry supplying a pulse for passage down a transmission line without materially loading the transmission line or attenuating the reflected signal.

In accordance with a principal feature of the present invention a time domain reflectometry system includes a source of input current pulses for application to a transmission line under test. The current pulse produces a step of voltage across the impedance of the line but the current pulse source, because of its high output impedance, produces substantially no loading effect on the line, and is therefore capable of driving lines of widely differing characteristic impedance. The output impedance of the current source is preferably at least 100 times greater than the characteristic impedance of the transmission line under test. As the voltage step passing down the line encounters a discontinuity or change in impedance, a reflection toward the input end of the line occurs. The input of the transmission line is also coupled to the input terminals of the display device, for example, an oscilloscope having good high frequency response. The pulse initially applied to the transmission line and the reflection therefrom and displayed on the oscilloscope whereby the location of the discontinuity causing the reflection is determined from the distance between the input pulse as viewed on the display device and its reflection. The size of the reflection is also a measure of the size of the impedance differential encountered.

In accordance with another feature of the present invention, the above-mentioned current source pulser includes a transistor output amplifier connected in common base configuration operated on the non-saturated region of the transistor characteristic. Therefore, the current source pulser provides a uniformly high impedance to the transmission line under test, and does not load the transmission line, nor does the pulser itself present a significant discontinuity.

In accordance with a further feature of the invention, the output transitor amplifier of the current source pulser is driven via both AC and DC coupling from a free-running tunnel diode relaxation oscillator. The AC coupling is effective to quickly cut off the output transistor amplifier and produce a fast rise time pulse for application to the transmission line. The DC coupling holds the output transistor amplifier off for a suitable period of time while a time constant circuit is provided between tunnel diode oscillator and the output transistor amplifier preventing the AC coupling from returning the output transistor amplifier to its conducting state prematurely.

Figure 2:
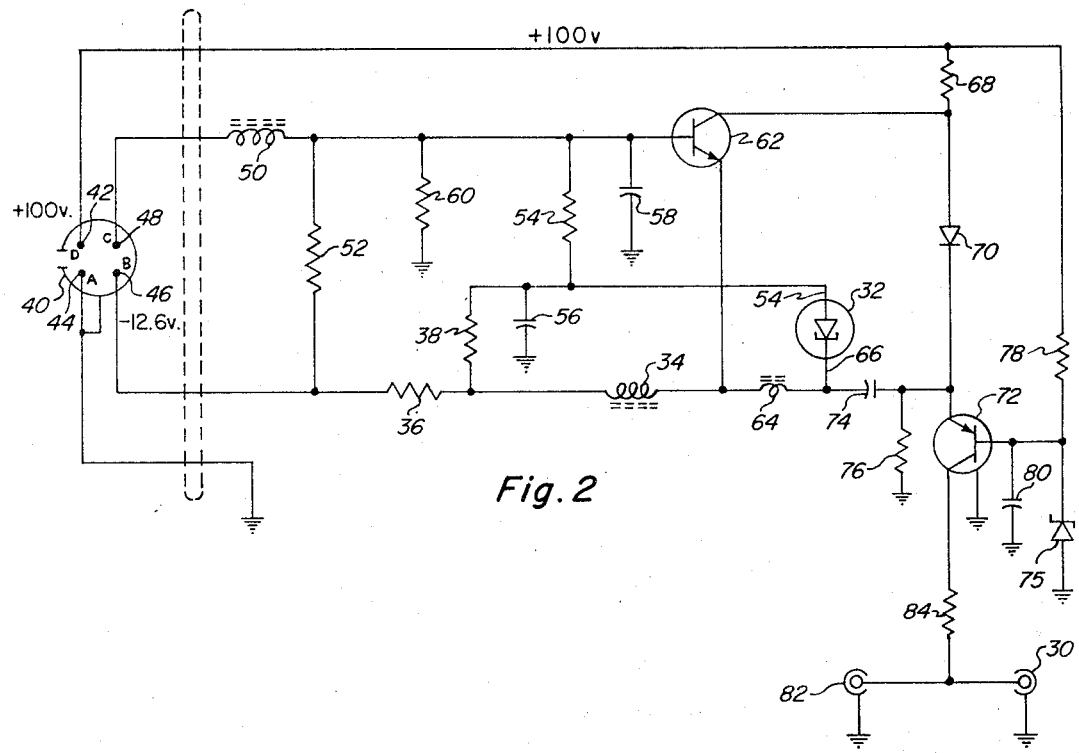

The subject matter which I regard as my invention is particularly pointed out and distinctly claimed in the concluding portion of this specification. The invention, however, both as to organization and method of operation, together with further advantages and objects thereof, may be understood by reference to the following description taken in connection with the accompanying drawings wherein like reference characters refer to like elements and in which:

FIG. 1 is a schematic diagram of a principal embodiment of the present invention comprising a system for ascertaining discontinuities in transmission lines; and FIG. 2 is a schematic diagram of a current source pulser in accordance with the present invention suitably employed in the FIG. 1 apparatus.

Referring to FIG. 1, a transmission line under test 10 having a characteristic impedance $Z_0$ is coupled at the input end 15 thereof to a detecting device which may comprise a display apparatus 12 such as an oscilloscope, or similar device portraying a high frequency signal with respect to a time base which is usually internally generated and triggered from the input signal. Display device 12 is desirably a sampling oscilloscope. Such an instrument as known in the art obtains high gain and fast rise time by reconstructing small samples of input signals taken from each of many identical repetitive input signals. Hundreds or thousands of repetitions may be employed to generate a single displayed equivalent pulse.

The display apparatus 12 desirably has an input impedance 17 equal to $Z_0$, the characteristic impedance of the transmission line under test and the transmission line is coupled across input terminals 14 and 16 of the display apparatus. If the input impedance of the display apparatus is less than the characteristic impedance of the transmission line, $Z_0$, an additional impedance is desirably inserted at point 18 between the display device and the transmission line. For example, if the input impedance of the display device is 50 ohms and the characteristic impedance of the transmission line is 300 ohms, then a resistance of 250 ohms is preferably inserted at point 18. If the input impedance of the display device is greater than the characteristic impedance of the transmission line a suitable shunt resistance connected across the terminals of the display device is employed.

In accordance with an important feature of the present invention, a current source pulser 19 is coupled across the transmission line input, this current source having a very high output impedance with therefore presenting substantially no discontinuity or loading effect upon the transmission line under test or the display device to which it is coupled. As a result the source does not attenuate signals passing from the transmission line toward the display device. Moreover, it is capable of providing an input pulse for a wide range of different impedance transmission lines. It can also be used with a display device or an oscilloscope having either a high or low input impedance. In short, the test system including the current source pulser is substantially unaffected by the very high impedance of source 19.

The circuit of the FIG. 1 embodiment provides a means for testing discontinuities and the like along the transmission line 10. For purposes of explanation, the transmission line 10 is illustrated as being terminated with an impedance 22 illustrative of a discontinuity. Termination impedance 22 may represent, for example, a short circuit, an open circuit, an imperfect coupling, a bend, or other imperfection or distortion in the line. The present invention is useful in determining the position of this discontinuity impedance with respect to the input end of the transmission line and the magnitude of the discontinuity. For determining the position of such discontinuity, current source pulser 10 provides a negative going pulse 20 of rapid rise time. This current pulse, of value, I produces a voltage across the transmission line equal to $$I \frac{Z_0}{2}$$

This voltage step wave travels down the transmission line from the input end 15 towards the discontinuity impedance 22. At discontinuity impedance 22, the step wave is reflected towards the display apparatus 12.

The trace on the oscilloscope 24 is illustrative of the voltage step wave and reflection portrayed with respect to a horizontal time base. Step 26 represents the original pulse from current source pulser 19 which travels down the transmission line, and pulse 28 represents the reflection returning back to display means 12. In this instance, the reflection step 28 is indicative of a relatively open circuit termination or one having higher impedance than $Z_0$.

The magnitude of the reflection is determined by the relative impedances $Z_1$ and $Z_0$ of the discontinuity impedance and the transmission line. The reflection is equal in value to the fraction $$\frac{e_r}{e_i} = \frac{Z_1 - Z_0}{Z_1 + Z_0}$$

where $e_r$ and $e_i$ are the values of reflected and incident steps of voltage respectively. The reflection $e_r$ passes unattenuated by the current pulser as it returns down the line to be monitored at display apparatus 12. The location of the discontinuity impedance 22 is found by noting the time difference between step 26 and the reflection 28 shown by the display apparatus. The time therebetween is equal to double the transit time of the length of the transmission line between the current source pulser 19 and the discontinuity impedance 22, assuming the display apparatus 12 is located substantially at the input end of the line. The velocity of propagation of the test line is conveniently determined from the characteristics of the dielectric used in its construction. For example, air dielectric has a velocity of propagation of approximately 30 centimeters per nanosecond while polyethylene has a velocity of propagation of approximately 20 centimeters per nanosecond. Velocity may be determined by the equation:

$$V = \frac{1}{e}(30) \text{ centimeters/nanosecond}$$

where V equals velocity and $e$ equals the dielectric constant of the material used in construction of the insulating portion of the tranmission line. Although for purposes of schematic illustration the transmission line 10 is depicted as an open wire type, it is understood the invention is adaptable to the testing of many other types of transmission lines, coaxial cable being the usual example. The system is useful for testing transmission lines employing the TEM mode of propagation rather than other modes.

FIG. 2 more fully illustrates the current source pulser 19 of FIG. 1. This source provides current pulses at output jack 30 for application to the transmission line under test. Typically the pulses provided have a rise time of less than 0.75 nanosecond and a length of slightly over 5 microseconds.

The initial source of impulses is a free-running tunnel diode relaxation oscillator of the $L/R$ type including tunnel diode 32, inductance 34 and resistances 36 and 38. The circuit is provided power via connector 40 which may be conveniently plugged into a mating conductor on the display apparatus or oscilloscope employed. In the example illustrated, terminal 42 provides approximately 100 volts with respect to grounded terminal 44 while the voltage at terminal 46 is typically 12 volts negative with respect to terminal 48 while terminal 48 is also conveniently a few volts negative with respect to ground. A decoupling network comprising inductance 50 and resistance 52 provides approximately 12 volts across resistance 52. Capacitance 58 is also part of the decoupling circuit and resistance 60 is a bleeder resistance for eventually discharging capacitance 58 when no voltage is applied thereacross. Resistance 54 provides a match between tunnel diode 32 and the transistor amplifier 62, while resistance 38 acts to provide a low impedance connection to a voltage source for the tunnel diode 32. Capacitance 56 bypasses anode terminal 54 to ground level for AC to hold voltage relatively constant.

Transistor amplifier 62 preferably a low leakage silicon transistor coupled in a common base configuration, so as to be normally cut off, has its emitter driven at the midpoint of a series connection between inductance 34 and a small ferrite bead inductance 64, the latter inductance coupling the inductance 34 to the output terminal 66 of the tunnel diode 32, in this instance its cathode. The collector electrode of transistor amplifier 62 is coupled through resistor 68 to 100 volt positive terminal 42 of the power connector, and the collector electrode is also coupled by way of diode 70 to the emitter electrode of an output transistor amplifier 72. The diode 70 is oriented with its anode toward the collector of transistor amplifier 62.

Output transistor amplifier 72 derives its principal input from terminal 66 of tunnel diode 32 via an AC connection including capacitor 74 having a resistance 76 connected from the output end thereof to ground. The common base of output transistor amplifier 72 is held at a constant slight positive voltage, around 6 volts, by means of Zener diode 75 coupled to the positive 100 volt point through a resistor 78, a capacitor 80 across the Zener diode also aiding in establishing the voltage at the common base of output transistor amplifier 72. Resistance 84 completes the circuit from the high impedance collector terminal of output transistor amplifier 72 to output jack 30 of the pulser and jack 82 used for convenient connection to the display apparatus or oscilloscope illustrated in FIG. 1.

During operation of the pulser of FIG. 2, a current of a few milliamperes (about 20) normally flows from terminal 42 of the power connector 40 through resistance 68, diode 70, the emitter-collector path of output transistor amplifier 72 and resistance 84 into the transmission line under test or the display device. Output transistor amplifier 72 has appropriate voltages applied thereto in the circuit shown to act as a non-saturated current switch for changing the current supplied through the resistor 84 from a few (e.g. about 20) milliamperes to 0 milliamperes in less than ¾ of a nanosecond.

Output transistor amplifier 72 is driven from tunnel diode 32. When the tunnel diode 32 switches to its high voltage state, as it does periodically, it quickly turns off output transistor amplifier 72 since cathode terminal 66 of the tunnel diode rapidlly becomes more negative and is AC coupled to the emitter of output transistor amplifier 72 via capacitor 74. As a result, a fast rise time negative going pulse is produced at that output jack 30 who is transmitted down the delay line under test as hereinbefore described. Also this initial pulse is coupled to the display apparatus through output jack 82.

Tunnel diode 32 is also DC coupled to the emitter of output transistor amplifier 72 through transistor 62. The DC coupling between tunnel diode 32 and output transistor amplifier 72 holds transistor amplifier 72 in a cutoff condition for a period conveniently in excess of 5 microseconds. The reflections caused by discontinuities in the transmission line will ordinarily return through the line to the display device during that time. When the tunnel diode 32 switches to its high voltage state, transistor amplifier 62 becomes saturated, reverse biasing diode 70 and maintaining output transistor amplifier 72 in the cutoff condition. After approximately five microseconds, the tunnel diode 32 switches back to its low voltage state at the end of its impulse period, at which time it tends to drive the emitter of transistor amplifier 72 in a positive direction by about half of a volt. This would cause an aberration to appear in the output of the pulser except for the time constant of the circuit including capacitor 74 and resistor 76. The emitter of transistor amplifier 72 is maintained reverse biased by the discharge of capacitor 74 through resistor 76 and thus the AC coupling does not cause conduction of the output transistor amplifier 72 prematurely. However when tunnel diode 32 has reverted to its low voltage state, transistor amplifier 62 changes from its saturated condition to its cutoff condition within about one microsecond. Therefore voltage is reestablished at the emitter of transistor amplifier 72 via diode 70, turning on transistor amplifier 72 and reestablishing a current of approximately 20 milliamperes through resistance 84.

During operation transistor 72 is biased such that in its conducting condition it remains unsaturated. It provides a relatively constant high impedance source of current to the load, not only by virtue of the common base configuration of the transistor amplifier 72, but more importantly because the transistor amplifier 72 never saturates. Although other current sources may be employed with the apparatus of FIG. 1, in accordance with the present invention, the transistorized current source herein described is preferred because of its advantages of fast, accurate operation in delivering a rapid rise time current pulse to the transmission line with a minimum of circuitry.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A time domain reflectometry system for testing reflections caused by impedance discontinuities in a transmission line otherwise characterized by a given characteristic impedance comprising:
    a detecting means for portraying a hgih frequency signal with respect to time and provided with a pair of input connections,
    coupling means for connecting the transmission line under test across said input connections, and
    a current source means for providing current signals connected across said transmission line and said detecting device for developing a voltage step wave across the characteristic impedance of said transmission line traveling down the transmission line for reflection back to said detecting means, said source means having a very high, substantially constant output impedance compared to the characteristic impedance of said transmission line so as not materially to load said line under test nor the said detecting means.

2. The system, according to claim 1, wherein the impedance of said source of signals is at least 100 times that of said transmission line under test.

3. A time domain reflectometry system for testing reflections from impedance discontinuities in a transmission line otherwise characterized by a given characteristic impedance comprising:
    a display means for portraying a high frequency signal with respect to an internally generated time base and provided with a pair of input connections to which such signal is normally applied,
    coupling means for connecting the transmission line under test across said input connections, and
    a current source means for providing current pulses connected across said transmission line and said display means for developing a voltage step wave across the characteristic impedance of said transmission line which travels down said transmission line for reflection at a line discontinuity back towards said display means so that the distance to said discontinuity may be determined from the transit time of said step wave to said discontinuity and back, the magnitude of the reflection being a measure of the discontinuity impedance, wherein said current source means has a high output impedance compared to the characteristic impedance of the transmission line and, does not materially load the line under test nor said display means.

4. A time domain reflectometry system for testing reflections from impedance discontinuities in a transmission line otherwise characterized by a given characteristic impedance comprising:

an oscilloscope display means for portraying a high frequency signal with respect to an internally generated time base and provided with a pair of input connections to which such signal is normally applied and, coupling means for connecting the transmission line under test across said input connections, said oscilloscope display means and said coupling means having a total impedance substantially equaling the characteristic impedance of the said transmission line, and a current source means for providing current pulses connected across said transmission line and said oscilloscope display means having an output impedance which is high in comparison to the characteristic impedance of said transmission line, so as not to materially load the line under test and said oscilloscope display means, for developing a voltage step wave across the characteristic impedance of said transmission line passing down said transmission line for reflection back towards said oscilloscope display means in order that the distance to said discontinuity may be determined from the transit time of said step wave to said discontinuity and back, and the impedance of the discontinuity may be determined from the magnitude of the reflected step wave.

5. A time domain reflectometry system for determining reflections from an impedance discontinuity in a transmission line otherwise characterized by given characteristic impedance comprising:

an oscilloscope display means for portraying a high frequency signal with respect to a time base which oscilloscope is provided with a pair of input connections to which such signal is normally applied and coupling means for connecting the transmission line under test across said input connections, a current source means, connected across said transmission line and said oscilloscope display means having a very high substantially constant output impedance with respect to the characteristic impedance of said transmission line, for developing a voltage step wave across the characteristic impedance of said transmission line, passing down said transmission line for reflection to said oscilloscope display means so that the location of said discontinuity may be determined from the transit time for said step wave to travel down the transmission line to said discontinuity and back, said current source means comprising a transistor amplifier connected in a common base configuration with the collector circuit providing the output drive to said transmission line, and means providing a pulse input to said transistor amplifier, wherein said transistor amplifier is always operated in a non-saturated condition whereby to provide a high output impedance to said transmission line.

6. The system according to claim 5 wherein said means providing a pulse input to said transistor amplifier comprises a free-running tunnel diode relaxation oscillator coupled to drive the emitter electrode of said amplifier to turn off said transistor amplifier.

7. The system according to claim 6 further including both AC and DC coupling between said tunnel diode relaxation oscillator and the emitter electrode of said transistor amplifier, and time constant means included in the AC coupling between said oscillator and said amplifier whereby to prevent premature re-energization of said amplifier from said tunnel diode relaxation oscillator at the end of an impulse period thereof.

8. A source of pulses for testing reflections from impedance discontinuities in a transmission line otherwise characterized by a given characteristic impedance wherein said pulses are for display on an oscilloscope apparatus including coupling means for connecting the transmission line under test to said oscilloscope apparatus, said source of pulses comprising current source means connected across said transmission line and said oscilloscope apparatus, which source means has an output impedance high in comparison to the characteristic impedance of said transmission line, said source means developing a voltage step wave across the characteristic impedance of said transmission line for passing down said transmission line and subsequent reflection at a line discontinuity back towards said oscilloscope apparatus for display thereon so that the distance to said discontinuity may be determined from the transit time of said step wave to said discontinuity and back, wherein said source of current because of its high impedance with respect to the impedance of said transmission line does not materially load the line under test and said oscilloscope apparatus, and impulse means for driving said source of current causing said source of current to deliver a rapid rise current pulse to said transmission line.

9. A source of current pulses suitable for use in a time domain reflectometry system, comprising:

a transistor output stage connected in a common base configuration for providing an output impulse at its collector electrode, a free-running tunnel diode relaxation oscillator provided with AC coupling between an electrode of the tunnel diode and the emitter electrode of said transistor output stage so that a rapid voltage excursion of the said electrode of the said tunnel diode causes sharp cutoff of said transistor amplifier stage, a second transistor amplifier stage coupled between said electrode of said tunnel diode and said emitter of said transistor output stage for preserving the cutoff condition of said transistor output stage during a pulse period of said tunnel diode oscillator, and a time constant circuit in the AC coupling between said tunnel diode oscillator and the emitter of said transistor amplifier output stage preventing premature re-energization of said transistor output stage through said AC coupling at the end of a pulse period of said tunnel diode oscillator.

10. A source of current pulses suitable for use in a time domain reflectometry system, comprising:

a transistor output stage connected in a common base configuration providing an output pulse at its collector electrode, a free-runing tunnel diode relaxation oscillator driving the emitter electrode of said transistor output stage producing a rapid voltage excursion of the said electrode of the said tunnel diode causing sharp cutoff of said transistor amplifier stage, a second transistor amplifier stage directly coupled between an electrode of said tunnel diode and said emitter of said transistor output stage whereby to preserve the cutoff condition of said transistor output stage during a pulse period of said tunnel diode oscillator, means for providing a substantially constant voltage to the base of said transistor output amplifier stage at a level for insuring non-saturation of said output amplifier stage, AC capacitive coupling between the said electrode of said tunnel diode and the emitter of said transistor output amplifier stage, and a resistance connecting the emitter end of said capacitive coupling to a point of common reference potential whereby to provide a time constant preventing premature re-energization of said transistor output stage at the conclusion of a pulse period of said tunnel diode relaxation oscillator.

References Cited

UNITED STATES PATENTS

| | | | |
|---|---|---|---|
| 2,651,752 | 9/1953 | Devot | 324—52 |
| 3,170,124 | 2/1965 | Candilis | 331—107 X |
| 3,191,065 | 6/1965 | Vargin | 307—88.5 |
| 3,211,997 | 10/1965 | Hara | 324—52 |
| 3,234,340 | 2/1966 | Youdan | 324—52 X |
| 3,264,494 | 8/1966 | Candilis | 331—107 X |
| 3,286,104 | 11/1966 | Laupretre | 307—88.5 |

OTHER REFERENCES

Honnel: Location of Line Faults, Electronics, November 1944, pp. 110–113.

Brinton: Electronic Pulse-Type Fault Locator Experience, Electrical Engineering, April 1955, pp. 282–284.

Halverson: Testing Microwave Transmission Lines Electronic, June 30, 1961, pp. 86–88.

Fault Locator, Electrical World, Dec. 9, 1963, p. 34.

RUDOLPH V. ROLINEC, *Primary Examiner.*

G. R. STRECKER, *Assistant Examiner.*

U.S. Cl. X.R.

331—107

UNITED STATES PATENT OFFICE
CERTIFICATE OF CORRECTION

Patent No. 3,434,049                                                   March 18, 1969

George J. Frye

It is certified that error appears in the above identified patent and that said Letters Patent are hereby corrected as shown below:

Column 3, line 44, "with" should read -- and --. Column 5, line 23, "slight" should read -- slightly --; line 52, "who" should read -- which --; line 70, cancel "of". Column 9, line 12, "Vargin" should read -- Vargiu --.

Signed and sealed this 31st day of March 1970.

(SEAL)
Attest:

Edward M. Fletcher, Jr.                            WILLIAM E. SCHUYLER, JR.
Attesting Officer                                                 Commissioner of Patents